United States Patent [19]

Ferris

[11] 4,294,483
[45] Oct. 13, 1981

[54] INFLATABLE VEHICLE COVER

[76] Inventor: Sean D. Ferris, 96 Spruce St., Natrona, Pa. 15065

[21] Appl. No.: 130,249

[22] Filed: Mar. 14, 1980

[51] Int. Cl.³ .............................................. B62D 25/00
[52] U.S. Cl. ...................................... 296/136; 180/84
[58] Field of Search .................. 160/19; 296/100, 101, 296/136; 180/84

[56] References Cited
U.S. PATENT DOCUMENTS

| | | | |
|---|---|---|---|
| 1,728,437 | 9/1929 | Mott | 296/136 |
| 2,688,513 | 9/1954 | Poirier | 296/136 X |
| 3,316,012 | 4/1967 | Thier | 296/136 |
| 4,093,302 | 6/1978 | Adams | 296/100 X |
| 4,219,218 | 8/1980 | Waldon | 296/136 X |

FOREIGN PATENT DOCUMENTS 1316397  4/1963  France .................. 296/136

*Primary Examiner*—Joseph F. Peters, Jr.
*Assistant Examiner*—Norman L. Stack, Jr.

*Attorney, Agent, or Firm*—Robert D. Yeager; Andrew J. Cornelius

[57] ABSTRACT

An inflatable vehicle cover especially adapted to cover cars and trucks being moved in transit comprises at least one inflatable cell of flexible air-confining material that substantially conforms to the configuration of such vehicles, and has inflating means therein and means for securing said cover to said vehicles. Each inflatable cell is formed by two sheets of air-confining material sealed along their perimeters to form an enclosed space capable of being inflated with air. The inflatable car cover may have sub-cells formed by pressure-seaming of one large cell; or it may have more than one cell suitably joined together. The deflated cover is placed over the vehicle in such manner that all exterior surfaces are covered; the cover is then secured about the vehicle by either an elasticized circumference or perimeter-engaging straps; and the cover is then inflated prior to transit. Upon arrival of the vehicle at its destination the cover is deflated, removed and rolled up; it is then available for reuse.

6 Claims, 3 Drawing Figures

INFLATABLE VEHICLE COVER

BACKGROUND OF THE INVENTION

1. Field of the Invention

This invention relates to vehicle covers and more specifically to those covers designed for use on automobiles being moved in railway transit.

2. Description of the Prior Art

Many vehicle covers are known for protecting cars, trucks and other vehicles from various conditions such as road and weather conditions. These also address problems of protecting certain specific areas of the vehicle such as windows, tires, etc., as well as problems relating to the nature of the cover itself, such as efficiency, portability, materials, etc. While the vehicle cover of this invention is also applicable for use in many situations, such as open storage or transportation on open racks on highways or railroads, it specifically addresses the problems of protecting vehicles, namely those automobiles and trucks that are in railway transit generally from factory to dealership. During transit, the automobiles on the railway cars are subject not only to weather conditions and the hazards of the track but to a special problem of vandalism which occurs when the trains ride through underpasses and rocks are thrown directly at the automobiles passing underneath. Thus a type of cover is needed that affords greater protection than that commonly found in standard car covers.

SUMMARY OF THE INVENTION

The vehicle cover of this invention is an inflatable cover that comprises at least one inflatable cell of flexible air-confining material that substantially conforms to the configuration of the vehicle and is adapted to surround the exterior of the vehicle. The cover is specifically applicable to cars and trucks in transit; it is also readily adapted to other vehicles and other situations requiring a vehicle cover.

The inflatable cover may be constructed as one cell which is large enough to cover the entire vehicle. This inflatable cell is formed by two sheets of air-confining material placed in such a manner that one overlies the other sheet. The sheets are joined along their perimeters to form an enclosed space or cell which can be inflated with air. The large cell so formed may then be further pressure seamed to form sub-cells such that the sub-cells conform to the various horizontal and vertical surfaces of the vehicle. Alternatively the inflatable cover may be constructed of more than one inflatable cell each conforming to a surface, such as the side or the hood-window-roof-window-trunk surface, which cells when suitably joined and in the aggregate, will totally surround the exterior surfaces of a car.

The deflated cover is placed around the vehicle and secured by either its elasticized perimeter and/or flexible perimeter-engaging straps. The cover is then inflated for transit of the vehicle, deflated upon arrival, removed, and made available for reuse.

The inflatable cover of this invention provides an air cushion that will absorb the force of projectiles directed at a car, either intentionally as in the aforementioned acts of vandalism, or those projectiles such as stones, debris, etc. which may be thrown up from the roadside (as in highway transit) or trackside (as in railway transit).

Another advantage of the inflatable cover is its insulating capacity. Conventional covers will protect to some degree from the elements although they frequently cause condensation under the cover and resultant rusting of the vehicle. An insulating cover like the inflatable cover of the present invention will not only protect against extremes in temperature, but may provide a moisture barrier and prevent this inner condensation.

BRIEF DESCRIPTION OF THE DRAWINGS

For a better understanding of the preferred embodiments described below, reference may be had to the drawing, in which.

DETAILED DESCRIPTION OF THE PREFERRED EMBODIMENTS

Figure 1:
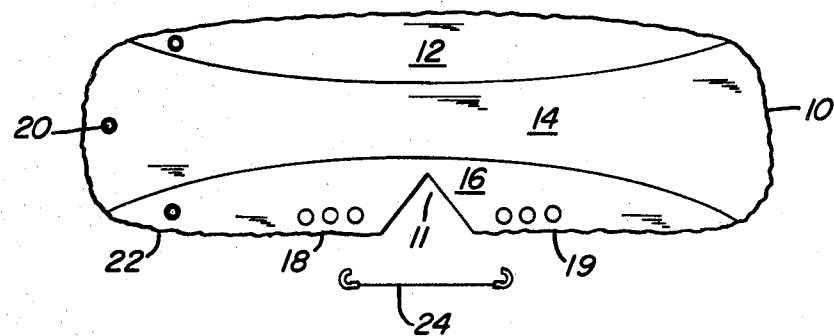
FIG. 1 is a top plan view of the vehicle cover of this invention as it would appear spread out flat.
Figure 2:
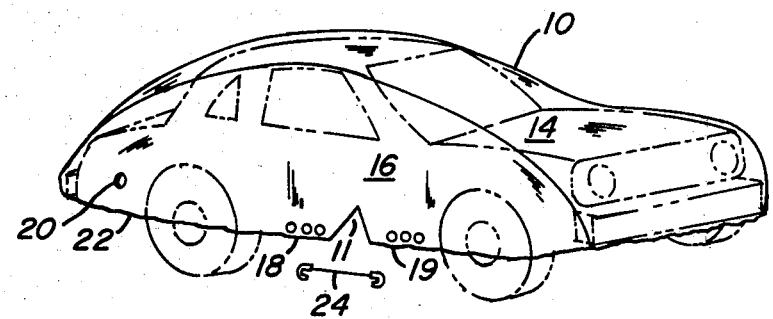
FIG. 2 is a view of the vehicle cover in position about an automobile.

In the preferred embodiment, shown in FIG. 1 and FIG. 2, the inflatable vehicle cover 10 defines a round cornered rectangle that is large enough to cover an entire automobile. The cover as shown in FIG. 1 is essentially one large cell formed by an upper sheet of air-confining material that overlies a lower sheet of air-confining material, which sheets are perimetrically seamed to form an enclosed space capable of being inflated. The upper sheet is slightly larger than the lower sheet and the two sheets are joined along their perimeters by pressure bonding or sewing to form a seam, and leaving a small portion of the upper sheet extending around said seam. This portion extending around the perimeter of the cover is lapped over an elasticized band and secured along its edge to the seam. The lower sheet which fits against the car surface may be ideally made of a softer more flexible air-confining material than the upper and outer sheet which may be made of durable, weather resistant air-confining material. The large cell so-formed is further partially seamed longitudinally to form sub-cells 12, 14, and 16, which may be in limited air communication with each other. When placed on an automobile as shown in FIG. 2, the inner cell 14 covers the upper surface defined by front bumper, hood, front window, roof, rear window, trunk and rear bumper. Side sub-cell 16 covers the entire side of the automobile and side sub-cell 12 (not shown in FIG. 2) will cover the other side of the car.

As best shown in FIG. 1, the perimeter 22 of the cover 10 is elasticized and has a notched portion 11, which is shown located along the lower perimeter of side sub-cell 16. A flexible strap such as a pungee cord 24 engages any of holes in sets 18 or 19 depending on the degree of tightness desired. When cord 24 is so engaged the perimeter is thereby closed and secured about the automobile.

In operation, the front edge of the deflated cover of the preferred embodiment as shown in FIG. 1, is placed under the front bumper of an automobile. As also seen in FIG. 1, the anterior and posterior ends of the cover are the same so that either end may serve as the front when placing the cover on a car. The deflated cover is then rolled up over and about the car and secured under the rear bumper. The elasticized perimeter 22 will effectively hold the cover on the car, holding it most securely in the regions where it is pulled substantially under the front and rear bumpers. Closing notch 11 with strap 24 will further tighten the cover about the car. After the cover is secured on the car it is inflated at inflating valves 20 and a protective air cushion is thereby provided which is capable of absorbing the force of a projectile (i.e. rock) directed at the car, thus preventing damage to the car. The aforesaid inflating valve consists of a valved nozzle adapted for operative connection with an air compressor.

The unitary construction of this embodiment makes it economical to manufacture and efficient to operate. Upon arrival of the automobile at its destination, the cover is deflated, easily rolled up, and made ready to use again.

Figure 3:
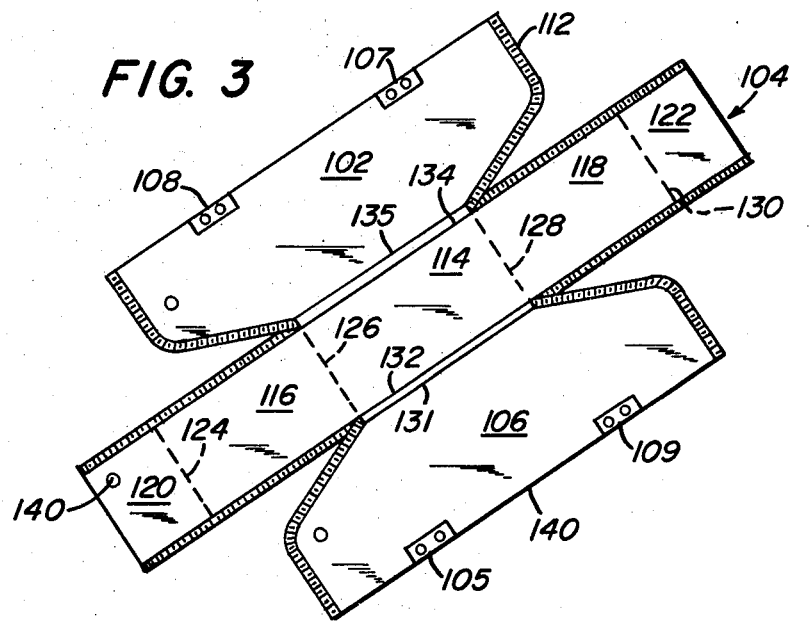
FIG. 3 is a top plan view of an alternate embodiment of the vehicle cover of this invention as it would appear when spread out flat.

In an alternate embodiment the cover has three cells—102, 104, 106, as shown in FIG. 3. Inner cell 104 defines a long narrow rectangular shape that is partially seamed horizontally along lines 124, 126, 128 and 130 to form sub-cells 120, 116, 114, 118 and 122. Side cell 102 has an upper perimeter portion 135 and side cell 106 has an equidistant upper perimeter portion 131. Perimetrical portions 131 and 136 are joined to perimetrical portions 132 and 134 of the inner cell 104 by appropriate means such as pressure bonding or sewing. Closure means, such as zippers 112 are disposed between the abutting free ends of cells 102, 104 and 106. Sets of reinforced holes 105, 107, 108 and 109 are disposed along the base perimeter of side cells 102 and 106 at spaced intervals. The geometrical shape and greater number of cells and sub-cells of this embodiment permit the cover a closer conformation to the shape of an automobile.

In operation, sub-cell 114 of the deflated cover of FIG. 3 is centered on the roof of an automobile. Sub-cell 114 is dimensioned to cover an automobile roof. Remaining sub-cells of cell 104 are likewise dimensioned according to their respective overlying positions when disposed over the car, that is: sub-cell 116 will cover the front window and hood; sub-cell 120 will cover the front headlight and bumper region; sub-cell 122 will cover the tail light and rear bumper region. When the center cell 104 is so placed on the automobile, side cells 102 and 104 will naturally fall to their proper positions covering the sides of the automobile. Zippers 112 are then closed to snugly fit the cover about the automobile. The cover is secured by straps (not shown) which transverse the undercarriage and engage reinforced holes in sets 105, 107, 108 and 109. After securing the cover to the car, each cell and sub-cell, the cover is inflated by inflating valve 140. As with the preferred embodiment the cover is later deflated and stored for later use. It will be appreciated by those skilled in the art that other combinations of air cells may fall within the spirit and scope of this invention, such as, for example, covers having a double layer of air cells for greater protection in the event an air cell is damaged in transit.

What is claimed is:

1. A cover for protecting the body of a vehicle during transit against damage from the force of foreign objects directed at said vehicle body comprising:
   a body member defining at least one cell adapted for inflation by the introduction of a fluid into said cell;
   a surface of said cell being shaped to conform to the contours of the outer surface of said vehicle body when said cell is inflated;
   means for allowing introduction of said fluid into said cell to inflate said cell and for permitting release of said fluid from said cell to deflate said cell; and
   means for securing said cell to said vehicle body to completely cover the exterior surface thereof.

2. The cover recited in claim 1 wherein said securing means includes means for securing a portion of said cell beneath a lower edge of said vehicle body to prevent air that flows around said vehicle body during transit thereof from disengaging said cover from said vehicle body.

3. The cover recited in claim 2 wherein said securing means secures said cell beneath at least one bumper of said vehicle body.

4. The cover recited in claim 2 wherein said body member comprises an upper sheet and a lower sheet of flexible air confining material, said upper and lower sheets defining the interior of said cell, said sheets being joined together at the peripheries thereof, said lower sheet being shaped to conform to the contours of the outer surface of said vehicle body when said cell is inflated.

5. The cover recited in claim 1 wherein said body member defines two side cells and one center cell, one edge of each of said side cells being joined to an edge of said center cell, said side cells covering the side vertical surfaces of said vehicle body and said center cell covering the horizontal surfaces and front and rear windows of said vehicle body when said cover is secured in place on said vehicle body and inflated.

6. The cover recited in claim 5 wherein each said side cells defines on the lower periphery of said side cell at least two openings and a notch disposed intermediate said openings, and wherein said securing means includes a flexible strap adapted to releasably engage said openings and draw together the sides of said notch to secure said cover on said vehicle body.

* * * * *